United States Patent [19]

Morita

[11] Patent Number: 4,460,769
[45] Date of Patent: Jul. 17, 1984

[54] THIO-AMINO-1,3,5-TRIAZINES
[75] Inventor: Eiichi Morita, Copley, Ohio
[73] Assignee: Monsanto Company, St. Louis, Mo.
[21] Appl. No.: 463,374
[22] Filed: Feb. 3, 1983

Related U.S. Application Data

[62] Division of Ser. No. 312,572, Oct. 19, 1981, Pat. No. 4,380,609.
[51] Int. Cl.³ ................. C07D 251/18; C07D 251/50; C07D 251/52
[52] U.S. Cl. .................... 544/197; 544/199; 544/205; 544/206; 544/208; 544/210
[58] Field of Search ............ 544/197, 199, 205, 206, 544/208, 210

[56] References Cited

U.S. PATENT DOCUMENTS

| 3,382,219 | 5/1968 | Trivette | 260/79.5 |
| 3,473,667 | 10/1969 | Coran et al. | 260/309.7 |
| 3,640,976 | 2/1972 | Boustany | 260/79.5 |
| 3,817,742 | 6/1974 | Brown | 71/93 |
| 4,301,260 | 11/1981 | Wilder | 525/348 |

Primary Examiner—John M. Ford
Attorney, Agent, or Firm—Larry R. Swaney

[57] ABSTRACT

Vulcanizable rubber compositions are described which are inhibited from premature vulcanization by thio-substituted-1,3,5-triazine-diamine or -triamine.

13 Claims, No Drawings

THIO-AMINO-1,3,5-TRIAZINES

This is a division of application Ser. No. 312,572, filed Oct. 19, 1981, now U.S. Pat. No. 4,380,609.

This invention relates to improved vulcanizable rubber compositions inhibited from premature vulcanization by thio-substituted-1,3,5-triazine diamine or -triamine.

BACKGROUND OF THE INVENTION 2-(thioamino)-4,6-diamino-1,3,5-triazines are known premature vulcanization inhibitors, U.S. patent application Ser. No. 148,061, filed May 12, 1980, now U.S. Pat. No. 4,301,260 issued Nov. 17, 1981. These known inhibitors are not commercially feasible because of their low potency.

SUMMARY OF THE INVENTION

A class of 1,3,5-triazine prevulcanization inhibitors has now been discovered which exhibit extraordinarily high potency. The new inhibitors are novel compounds which contain at least two thioamino groups attached to the triazine ring. Preferred inhibitors contain two (dithio)amino groups and more preferred inhibitors contain three (dithio)amino groups. The improved inhibitors of the invention are characterized by the formula

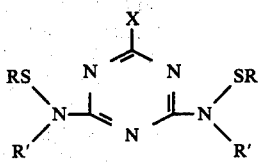

in which R' is hydrogen or —SR, X is hydrogen, chloro, alkoxy of 1-5 carbon atoms, alkylthio of 1-5 carbon atoms, —NHR", —N(R")$_2$ where R" is R or allyl, —NHSR, —N(SR)$_2$ or —R, and R is alkyl of 1-12 carbon atoms or alkyl substituted by cyano, acetoxy or alkoxycarbonyl of 2-5 carbon atoms, cycloalkyl of 5-8 carbon atoms, aralkyl of 7-10 carbon atoms, phenyl, or phenyl substituted by chloro, alkyl of 1-5 carbon atoms, or alkoxy of 1-5 carbon atoms.

Examples of R radicals are methyl, ethyl, propyl, isopropyl, n-butyl, sec-butyl, isobutyl, t-butyl, pentyl, hexyl, heptyl, octyl, t-octyl(1,1,3,3 tetramethylbutyl) nonyl, decyl, dodecyl, 2(acetoxy)ethyl, 2-cyanoethyl, 2(methoxycarbonyl)ethyl, 2(ethoxycarbonyl)ethyl, methoxycarbonylmethyl, cyclohexyl, 4-methylcyclohexyl, 2-methylcyclohexyl, cycloheptyl, cyclopentyl, cyclooctyl, phenyl, benzyl, α-methylbenzyl, phenethyl, phenylpropyl, 2-chlorophenyl, 3-chlorophenyl, 4-chlorophenyl, 2-methylphenyl, 3-methylphenyl, 4-methylphenyl, 2,4-dimethylphenyl, 4-t-butylphenyl, 4-ethoxyphenyl, 4-methoxyphenyl, 4-(methylthio)phenyl and 2-ethyl-4-butylphenyl.

In preferred compounds of the invention, R is $C_5$–$C_8$ cycloalkyl preferably cyclohexyl, or secondary $C_3$–$C_8$ alkyl, preferably isopropyl, or phenyl.

Illustrative examples of inhibitors of the invention are:

N,N,N',N',N",N" hexakis(methylthio)1,3,5-triazine-2,4,6-triamine,
N,N,N',N',N",N" hexakis(ethylthio)1,3,5-triazine-2,4,6-triamine,
N,N,N',N',N",N" hexakis(propylthio)1,3,5-triazine-2,4,6-triamine,
N,N,N',N',N",N" hexakis(butylthio)1,3,5-triazine-2,4,6-triamine,
N,N,N',N',N",N" hexakis(2-butylthio)1,3,5-triazine-2,4,6,-triamine,
N,N,N',N',N",N" hexakis(pentylthio)1,3,5-triazine-2,4,6-triamine,
N,N,N',N',N",N" hexakis(hexylthio)1,3,5-triazine-2,4,6-triamine,
N,N,N',N',N",N" hexakis(cyclopentylthio)1,3,5-triazine-2,4,6-triamine,
N,N,N',N',N",N" hexakis(cyclooctylthio)1,3,5-triazine-2,4,6-triamine,
N,N,N',N',N",N" hexakis(benzylthio)1,3,5-triazine-2,4,6-triamine,
N,N,N',N',N",N" hexakis(α-methylbenzylthio)1,3,5-triazine-2,4,6-triamine,
N,N,N',N',N",N" hexakis(2-methylphenylthio)1,3,5-triazine-2,4,6-triamine,
N,N,N',N',N",N" hexakis(2-methoxyphenylthio)1,3,5-triazine-2,4,6-triamine,
N,N,N',N',N",N" hexakis(2-chlorophenylthio)1,3,5-triazine-2,4,6-triamine,
N,N,N',N',N",N" hexakis-[2(methoxycarbonyl)ethylthio]1,3,5-triazine-2,4,6-triamine,
N,N,N',N' tetra(methylthio)1,3,5-triazine-2,4-diamine,
N,N,N'N' tetra(ethylthio)1,3,5-triazine-2,4-diamine,
N,N,N',N' tetra(propylthio)1,3,5-triazine-2,4-diamine,
N,N,N',N' tetra(butylthio)1,3,5-triazine-2,4-diamine,
N,N,N',N' tetra(2-butylthio)1,3,5-triazine-2,4-diamine,
N,N,N',N' tetra(pentylthio)1,3,5-triazine-2,4-diamine,
N,N,N',N' tetra(hexylthio)1,3,5-triazine-2,4-diamine,
N,N,N',N' tetra(cyclopentylthio)1,3,5-triazine-2,4-diamine,
N,N,N',N' tetra(cyclooctylthio)1,3,5-triazine-2,4-diamine,
N,N,N',N' tetra(benzylthio)1,3,5-triazine-2,4-diamine,
N,N,N',N' tetra(α-methylbenzylthio)1,3,5-triazine-2,4-diamine,
N,N,N',N' tetra(2-methylphenylthio)1,3,5-triazine-2,4-diamine,
N,N,N',N' tetra(2-methoxyphenylthio)1,3,5-triazine-2,4-diamine,
N,N,N',N' tetra(2-chlorphenylthio)1,3,5-triazine-2,4-diamine,
N,N,N',N' tetra(methylthio)-6-chloro-1,3,5-triazine-2,4-diamine,
N,N,N',N' tetra(ethylthio)-6-chloro-1,3,5-triazine-2,4-diamine,
N,N,N',N' tetra(propylthio)-6-chloro-1,3,5-triazine-2,4-diamine,
N,N,N',N' tetra(butylthio)-6-chloro-1,3,5-triazine-2,4-diamine,
N,N,N',N' tetra(2-butylthio)-6-chloro-1,3,5-triazine-2,4-diamine,
N,N,N',N' tetra(pentylthio)-6-chloro-1,3,5-triazine-2,4-diamine,
N,N,N',N' tetra(hexylthio)-6-chloro-1,3,5-triazine-2,4-diamine,
N,N,N',N' tetra(cyclopentylthio)-6-chloro-1,3,5-triazine-2,4-diamine,
N,N,N',N' tetra(cyclooctylthio)-6-chloro-1,3,5-triazine-2,4-diamine,
N,N,N',N' tetra(benzylthio)-6-chloro-1,3,5-triazine-2,4-diamine,
N,N,N',N' tetra(α-methylbenzylthio)-6-chloro-1,3,5-triazine-2,4-diamine, N,N,N',N' tetra(2-methylphenylthio)-6-chloro-1,3,5-triazine-2,4-diamine,
N,N,N',N' tetra(2-methoxyphenylthio)-6-chloro-1,3,5-triazine-2,4-diamine,
N,N,N',N' tetra(2-chlorophenylthio)-6-chloro-1,3,5-triazine-2,4-diamine,
N,N' di(methylthio)-6-chloro-1,3,5-triazine-2,4-diamine,
N,N' di(ethylthio)-6-chloro-1,3,5-triazine-2,4-diamine,
N,N' di(propylthio)-6-chloro-1,3,5-triazine-2,4-diamine,
N,N' di(butylthio)-6-chloro-1,3,5-triazine-2,4-diamine,
N,N' di(2-butylthio)-6-chloro-1,3,5-triazine-2,4-diamine,
N,N' di(pentylthio)-6-chloro-1,3,5-triazine-2,4-diamine,
N,N' di(hexylthio)-6-chloro-1,3,5-triazine-2,4-diamine,
N,N' di(cyclopentylthio)-6-chloro-1,3,5-triazine-2,4-diamine,
N,N' di(cyclooctylthio)-6-chloro-1,3,5-triazine-2,4-diamine,
N,N' di(benzylthio)-6-chloro-1,3,5-triazine-2,4-diamine,
N,N' di(α-methylbenzylthio)-6-chloro-1,3,5-triazine-2,4-diamine,
N,N' di(2-methylphenylthio)-6-chloro-1,3,5-triazine-2,4-diamine,
N,N' di(2-methoxyphenylthio)-6-chloro-1,3,5-triazine-2,4-diamine,
N,N' di(2-chlorophenylthio)-6-chloro-1,3,5-triazine-2,4-diamine,
N,N,N',N' tetra(cyclohexylthio)-6-methoxy-1,3,5-triazine-2,4-diamine,
N,N,N',N' tetra(benzylthio)-6-methoxy-1,3,5-triazine-2,4-diamine,
N,N,N',N' tetra(isopropylthio)-6-methoxy-1,3,5-triazine-2,4-diamine,
N,N,N',N' tetra(cyclohexylthio)-6-phenyl-1,3,5-triazine-2,4-diamine,
N,N,N',N' tetra(benzylthio)-6-phenyl-1,3,5-triazine-2,4-diamine,
N,N,N',N' tetra(isopropylthio)-6-phenyl-1,3,5-triazine-2,4-diamine,
N,N,N',N' tetra(cyclohexylthio)-6-methyl-1,3,5-triazine-2,4-diamine,
N,N,N',N' tetra(benzylthio)-6-methyl-1,3,5-triazine-2,4-diamine, and
N,N,N',N' tetra(isopropylthio)-6-methyl-1,3,5-triazine-2,4-diamine.

The inhibitors of the invention are incorporated into rubber stocks by mixing on a mill or in an internal mixer such as a Banbury mixer. However, the inhibitors may be incorporated by addition to latex, if desired. The process of the invention is particularly applicable to sulfur-vulcanizable rubber compositions containing a sulfur vulcanizing agent such as an amine disulfide or a polymeric polysulfide but preferably, the vulcanizing agent is elemental sulfur (usually about 0.5–5 parts by weight of sulfur are used per 100 parts by weight of rubber). Rubber compositions containing organic accelerating agents are particularly improved by the inhibitors of the invention, for example, compositions containing 2-mercaptobenzothiazole or benzothiazole sulfenamide accelerators. The inhibitors of the invention are especially potent in vulcanizable compositions in which the accelerator system comprises benzothiozyl disulfide and diphenylguanidine (DPG), cure activator. Any organic accelerating agent in an amount effective (generally about 0.1–5 parts by weight accelerator per 100 parts by weight rubber) to accelerate the sulfur vulcanization of rubber is satisfactory in the practice of this invention. The inhibitors of the invention are effective with any sulfur-vulcanizable natural and synthetic rubber and mixtures thereof. Diene rubbers are preferred. Suitable accelerators and rubbers are described in U.S. Pat. No. 3,546,185, Col. 9, lines 53–75; Col. 10, lines 15–21; and U.S. Pat. No. 3,780,001, Col. 4, lines 43–72; Col. 5, lines 5–33 respectively, the disclosures of which are incorporated herein by reference. The vulcanizable composition may also contain conventional compounding ingredients such as reinforcing pigments, extenders, processing oils, antidegradants and the like.

Small amounts of inhibitors are effective to inhibit premature vulcanization. Improvements in processing safety may be observed with 0.05 parts or less of inhibitor per 100 parts of rubber. Although there is no upper limit in the amount of inhibitor used, generally the amount does not exceed 5 parts inhibitor per 100 parts of rubber. Typically, the amount of inhibitor added is about 0.1 to 2.5 parts per 100 parts of rubber with amounts of about 0.2 to 1 part inhibitor per 100 parts of rubber being preferred. Methods for determining scorch times and curing characteristics of rubber stocks used in illustrating this invention are described in U.S. Pat. No. 3,546,185, Col. 13, lines 30–53. Stress-strain properties are reported in megapascals (MPa).

PREFERRED EMBODIMENTS

A suitable procedure for preparing compounds of the invention comprises adding at about 0°–75° C., usually at room temperature, a sulfenyl chloride to a slurry or solution of appropriate triazine in an inert organic medium, such as acetonitrile or dioxane, in the presence of an acid acceptor such as triethylamine. The sulfenyl chloride may be prepared by chlorination of an appropriate disulfide, for example, by chlorination of a slurry of phenyl disulfide in toluene. After the sulfenyl chloride is reacted, the amine salt by-product is removed by filtration. The filtrate is washed with water and dried over sodium sulfate. The product is recovered by evaporating the solvent and is further purified by conventional procedures.

An alternate procedure for preparing inhibitors of the invention comprises reacting a sulfenyl chloride with an alkali metal (preferably sodium or potassium) salt of an appropriate substituted triazine. The alkali metal salt intermediate may be prepared by reacting an alkali metal alcoholate and substituted triazine in an inert organic medium and removing the alcohol by-product by distillation. The resulting slurry of triazine alkali metal salt may be reacted, without further purification, with the sulfenyl chloride reactant. The sulfenyl chloride is generally added dropwise to room temperature to the aforesaid slurry. Salt by-product and any unreacted alkali metal salt intermediate is recovered by filtration. When the product is insoluble, the filter cake is washed with water to remove salt by-product. When the product is soluble in the reaction medium, the product is recovered by evaporation. Generally, the product is further purified by recrystallization from an appropriate solvent, such as, toluene, ether, alcohol, or mixture of hexane and methylene dichloride. Product identification is confirmed by liquid chromatographic analysis, infrared spectral analysis, and nuclear magnetic spectral analysis.

EXAMPLE 1

To a stirred solution comprising 0.1 mole of 1,3,5-triazine-2,4,6-triamine (melamine), about 0.7 mole of triethylamine and 125 ml. of acetonitrile, there is slowly added over a period of about two hours at room temperature a solution comprising 0.6 mole of 2-propane sulfenyl chloride and 300 ml. of toluene. The resulting slurry is stirred for one additional hour. Amine hydro chloride by-product and a small quantity of unreacted melamine is recovered by filtration. Solvents are removed from the filtrate by evaporation. The residue is washed with ether, then digested with ethanol. N,N,N',N',N'',N''-hexakis(isopropylthio)-1,3,5-triazine-2,4,6-triamine, m.p. 151°–152° C. recrystallized from ethanol is recovered. Chemical analysis gives 33.75% S and 14.72% N compared to 33.69% S and 14.22% N calculated for $C_{21}H_{42}N_6S_6$. Infrared spectral analysis shows no NH groups. NMR analysis shows a $C_{13}$ shift only at 173.37 ppm in reference to TMS≡O which indicates that the amine nitrogen atoms are completely substituted.

EXAMPLES 2–5

By following procedures similar to Example 1, except a different sulfenyl chloride reactant is used, the following compounds are prepared. It is understood that the amino nitrogens are fully substituted and for convenience the position of the six nitrogen substituents are omitted from the names.

(2) Hexakis(phenylthio)-1,3,5-triazine-2,4,6-triamine, m.p. 156°–157° C.; 24.71% S and 10.94% N found compared to 24.82 and 10.84 calculated for $C_{39}H_{30}N_6S_6$.

(3) Hexakis(cyclohexylthio)-1,3,5-triazine-2,4,6-triamine, m.p. 145° C.; 22.67% S and 10.22% N found compared to 23.71% S and 10.36% N calculated for $C_{39}H_{66}N_6S_6$.

(4) Hexakis(4-chlorophenylthio)-1,3,5-triazine-2,4,6-triamine, m.p. 163° C.; 19.27% S found compared to 19.59% S calculated for $C_{39}H_{24}ClN_6S_6$.

(5) Hexakis(4-methylphenylthio)-1,3,5-triazine-2,4,6-triamine, m.p. 167°–168° C.; 22.41% S found compared to 22.47% calculated for $C_{45}H_{42}N_6S_6$.

EXAMPLES 6–13

These examples illustrate the preparation of 1,3,5-triazine-2,4-diamine derivatives by reaction of sulfenyl chloride and 1,3,5-triazine-2,4-diamine, 6-chloro-1,3,5-triazine-2,4-diamine, 6-phenyl-1,3,5-triazine-2,4-diamine, 6-(diallylamino)-1,3,5-triazine-2,4-diamine, or 6-methoxy-1,3,5-triazine-2,4-diamine. The procedure of Example 1 tends to give a reaction product mixture from which the corresponding N,N'-di(thio)- and N,N,N',N'-tetra(thio) derivatives may be isolated. Reaction temperatures of 10° C. or below and excess acid acceptor favor formation of the tetra-substituted product, whereas, reaction temperatures of 25° C. or above favor formation of the di-substituted product. The following compounds are prepared.

(6) N,N,N',N'-tetra(phenylthio)-1,3,5-triazine-2,4-diamine, m.p. 117° C., 23.81% S found compared to 23.58 calculated for $C_{27}H_{21}N_5S_4$.

(7) N,N,N',N'-tetra(phenylthio)-6-methoxy-1,3,5-triazine-2,4-diamine, m.p. 140°–141° C., 22.24% S found compared to 22.35% S calculated for $C_{28}H_{23}N_5OS_4$.

(8) N,N,N',N'-tetra(phenylthio)-6-phenyl-1,3,5-triazine-2,4-diamine, m.p. 112°–113° C., 21.17% S found compared to 20.69% S calculated for $C_{33}H_{25}N_5S_4$.

(9) N,N'-di(phenylthio)-6-phenyl-1,3,5-triazine-2,4-diamine, m.p. 183°–185° C., 16.61% S and 17.38% N found compared to 15.89% S and 17.35% N calculated for $C_{21}H_{17}N_5S_2$.

(10) N,N'-di(phenylthio)-6-chloro-1,3,5-triazine-2,4-diamine, m.p. 167° C. (decomp.), 16.61% S found compared to 17.72% S calculated for $C_{15}H_{12}ClN_5S_2$.

(11) N,N'-di(cyclohexylthio)-6-chloro-1,3,5-triazine-2,4-diamine, m.p. 183°–184° C., 17.24% S found compared to 17.15% S calculated for $C_{15}H_{24}ClN_5S_2$.

(12) N,N-di(isopropylthio)-6-chloro-1,3,5-triazine-2,4-diamine, m.p. 139° C., 22.50% S found compared to 21.81% S calculated for $C_9H_{16}ClN_5S_2$.

(13) N,N,N',N'-tetra(isopropylthio)-6-chloro-1,3,5-triazine-2,4-diamine, m.p. 97°–98° C., 28.50% S found compared to 29.01% S calculated for $C_{15}H_{28}ClN_5S_4$.

EXAMPLE 14

Benzene sulfenyl chloride (0.2 mole) in toluene is added slowly at 10° C. to a solution comprising N,N-diallyl-1,3,5-trazine-2,4,6-triamine (0.05 mole), triethylamine (0.22 mole) and 100 ml. of acetonitrile. The solids are removed by filtration. The filtrate is washed with water and then dried over anhydrous $Na_2SO_4$, filtered, and vacuum stripped to recover 33.0 grams of product. N,N-Di(allyl)-N',N',N'',N''-tetra(phenylthio)-1,3,5-triazine-2,4,6-triamine m.p. 106°–107° C., is recovered. Chemical analysis gives 20.42% S compared to 20.07% S calculated for $C_{33}H_{30}N_6S_4$.

Natural rubber and styrene-butadiene rubber masterbatches containing the ingredients shown below are prepared by conventional mixing procedures. Portions of the masterbatch containing no inhibitor are controls. A quantity of inhibitor is incorporated into other portions of the masterbatch. Accelerator and sulfur are also incorporated to form vulcanizable compositions. The properties of the vulcanizable compositions and vulcanizates are measured by conventional methods as described above. The Mooney scorch is determined at the indicated temperatures. Vulcanizates are prepared by curing at 153° for the time required to obtain optimum cure as indicated by Rheometer data. Santocure®NS accelerator is N-(t-butyl)-2-benzothiazole sulfenamide. Thiofide® accelerator is benzothiazolyl disulfide. DPG is diphenylguanidine, a cure activator. Thiurad® accelerator is tetramethylthiuram disulfide. Methasan® accelerator is zinc dimethyldithiocarbamate. Santoflex® antidegradant is N-(1,3-dimethylbutyl)-N'-phenyl-paraphenylenediamine. The results are shown in the tables.

| Ingredients (Parts by Weight) | Masterbatch A | Masterbatch B |
|---|---|---|
| Smoked Sheets | 100 | — |
| SBR-1500 | — | 100 |
| Carbon Black | 40 | 50 |
| Processing Oil | 10 | 12 |
| Zinc Oxide | 5 | 4 |
| Stearic Acid | 1 | 2 |
| Wax | 2 | — |
| | 158 | 168 |

TABLE 1

| | 1 | 2 | 3 | 4 | 5 | 6 | 7 | 8 | 9 | 10 | 11 |
|---|---|---|---|---|---|---|---|---|---|---|---|
| A | 158 | 158 | 158 | 158 | 158 | 158 | 158 | 158 | 158 | 158 | 158 |
| Sulfur | 2.5 | 2.5 | 2.5 | 2.5 | 2.5 | 2.5 | 2.5 | 2.5 | 2.5 | 2.5 | 2.5 |
| Santocure NS Accelerator | 0.5 | 0.5 | 0.5 | 0.5 | 0.5 | — | — | — | — | — | — |
| Thiofide | — | — | — | — | — | 0.8 | 0.8 | 0.8 | 0.8 | 0.8 | 0.8 |
| DPG | — | — | — | — | — | 0.2 | 0.2 | 0.2 | 0.2 | 0.2 | 0.2 |
| Hexakis(phenylthio)-1,3,5-triazine-2,4,6-triamine | — | 0.5 | — | — | — | — | 0.5 | — | — | — | — |
| Hexakis(cyclohexylthio)-1,3,5-triazine-2,4,6-triamine | — | — | 0.5 | — | — | — | — | 0.5 | — | — | — |
| Hexakis(isopropylthio)-1,3,5-triazine-2,4,6-triamine | — | — | — | 0.5 | — | — | — | — | 0.5 | — | — |
| Hexakis(4-chlorophenyl-thio)-1,3,5-triazine-2,4,6-triamine | — | — | — | — | 0.5 | — | — | — | — | 0.5 | — |
| Hexakis(4-methylphenyl-thio)-1,3,5-triazine-2,4,6-triamine | — | — | — | — | — | — | — | — | — | — | 0.5 |
| Mooney Scorch, °C. | 135 | 135 | 135 | 135 | 135 | 121 | 121 | 121 | 121 | 121 | 121 |
| $t_5$, minutes | 10.4 | 30.5 | 36.5 | 44.6 | 23.4 | 9.2 | 30.0 | 28.4 | 73.5 | 19.9 | 24.8 |
| % increase in scorch safety | — | 193 | 251 | 329 | 125 | — | 226 | 209 | 699 | 116 | 170 |
| Stress-Strain @ 153° C. | | | | | | | | | | | |
| UTS, MPa | 26.2 | 24.0 | 26.5 | 24.7 | 25.8 | 27.5 | 26.3 | 23.1 | 25.7 | 27.3 | 29.6 |
| $M_{300}$, MPa | 8.5 | 6.6 | 8.7 | 7.9 | 7.7 | 9.5 | 8.7 | 8.7 | 8.2 | 9.1 | 7.9 |
| Elong., % | 610 | 650 | 610 | 610 | 620 | 610 | 610 | 570 | 630 | 630 | 620 |

TABLE 2

| | 1 | 2 | 3 | 4 | 5 | 6 | 7 | 8 | 9 |
|---|---|---|---|---|---|---|---|---|---|
| Masterbatch A | 158 | 158 | 158 | 158 | 158 | 158 | 158 | 158 | 158 |
| Sulfur | 2.5 | 2.5 | 2.5 | 2.5 | 2.5 | 2.5 | 2.5 | 2.5 | 2.5 |
| Santocure NS Accelerator | 0.5 | 0.5 | 0.5 | 0.5 | 0.5 | 0.5 | 0.5 | 0.5 | 0.5 |
| Hexakis(phenylthio)-1,3,5-triazine-2,4,6-triamine | — | 0.5 | — | — | — | — | — | — | — |
| N,N'—di(cyclohexylthio)-6-chloro-1,3,5-triazine-2,4-diamine | — | — | 0.5 | — | — | — | — | — | — |
| N,N,N',N',—tetra(phenyl-thio)-1,3,5-triazine-2,4-diamine | — | — | — | 0.5 | — | — | — | — | — |
| N,N'—di(phenylthio)-6-chloro-1,3,5-triazine-2,4-diamine | — | — | — | — | 0.5 | — | — | — | — |
| N,N'—di(phenylthio)-6-phenyl-1,3,5-triazine-2,4-diamine | — | — | — | — | — | 0.5 | — | — | — |
| N,N,N',N',—tetra(phenyl-1,3,5-triazine-2,4-diamine | — | — | — | — | — | — | 0.5 | — | — |
| N,N—di(allyl),N',N',N'',N'',—tetra(phenylthio)-1,3,5-triazine-2,4,6-triamine | — | — | — | — | — | — | — | 0.5 | — |
| N,N,N',N'—tetra(phenylthio)-6-methoxy-1,3,5-triazine-2,4-diamine | — | — | — | — | — | — | — | — | 0.5 |
| Mooney Scorch @ 135° C. | | | | | | | | | |
| $t_5$, minutes | 11.6 | 34.1 | 34.7 | 29.4 | 29.7 | 28.0 | 29.0 | 27.4 | 30.7 |
| % increase in scorch safety | — | 194 | 199 | 153 | 156 | 141 | 150 | 136 | 165 |
| Stress-Strain @ 153° C. | | | | | | | | | |
| UTS, MPa | 26.7 | 23.2 | 25.6 | 26.2 | 24.1 | 25.5 | 23.3 | 26.0 | 23.4 |
| $M_{300}$, MPa | 8.9 | 9.3 | 8.1 | 8.7 | 7.9 | 8.5 | 8.7 | 9.4 | 8.7 |
| Elong., % | 600 | 550 | 610 | 610 | 590 | 600 | 570 | 580 | 580 |

TABLE 3

| | 1 | 2 | 3 | 4 | 5 | 6 | 7 | 8 | 9 | 10 | 11 |
|---|---|---|---|---|---|---|---|---|---|---|---|
| Masterbatch A | 158 | 158 | 158 | 158 | 158 | 158 | 158 | 158 | 158 | 158 | 158 |
| Sulfur | 2.5 | 2.5 | 2.5 | 2.5 | 2.5 | 2.5 | 2.5 | 2.5 | 2.5 | 2.5 | 2.5 |
| Thiofide | 0.8 | 0.8 | 0.8 | 0.8 | 0.8 | 0.8 | 0.8 | 0.8 | 0.8 | 0.8 | 0.8 |
| DPG | 0.2 | 0.2 | 0.2 | 0.2 | 0.2 | 0.2 | 0.2 | 0.2 | 0.2 | 0.2 | 0.2 |
| N,N'—di(cyclohexylthio)-6-chloro-1,3,5-triazine | — | 0.5 | — | — | — | — | — | — | — | — | — |

TABLE 3-continued

|  | 1 | 2 | 3 | 4 | 5 | 6 | 7 | 8 | 9 | 10 | 11 |
|---|---|---|---|---|---|---|---|---|---|---|---|
| 2,4-diamine |  |  |  |  |  |  |  |  |  |  |  |
| N,N,N',N'—tetra(phenylthio)-1,3,5-triazine-2,4-diamine | — | — | 0.5 | — | — | — | — | — | — | — | — |
| N,N'di(phenylthio)-6-chloro-1,3,5-triazine-2,4-diamine | — | — | — | 0.5 | — | — | — | — | — | — | — |
| N,N'di(phenylthio)-6-phenyl 1,3,5-triazine-2,4,-diamine | — | — | — | — | 0.5 | — | — | — | — | — | — |
| N,N,N',N'—tetra(phenylthio)-6,phenyl-1,3,5-triazine-2,4-diamine | — | — | — | — | — | 0.5 | — | — | — | — | — |
| N,N—di(allyl)-N',N',N'',N''—tetra(phenylthio)-1,3,5-triazine-2,4,6-triamine | — | — | — | — | — | — | 0.5 | — | — | — | — |
| N,N,N',N'—tetra(phenylthio)-6-methoxy-1,3,5-triazine-2,4,-diamine | — | — | — | — | — | — | — | 0.5 | — | — | — |
| N,N—di(isopropylthio)-6-chloro-1,3,5-triazine-2,4,-diamine | — | — | — | — | — | — | — | — | — | 0.5 | — |
| N,N,N',N' tetra(isopropylthio)-6-chloro-1,3,5-triazine-2,4,6-triamine | — | — | — | — | — | — | — | — | — | — | 0.5 |
| Mooney Scorch @ 121° C. |  |  |  |  |  |  |  |  |  |  |  |
| t5, minutes | 11.2 | 26.9 | 26.5 | 21.7 | 20.1 | 26.3 | 26.1 | 28.0 | 12.8 | 36.0 | 86.8 |
| % increase in scorch safety | — | 140 | 136 | 94 | 79 | 135 | 133 | 150 | — | 181 | 578 |
| Stress-Strain @ 153° C. |  |  |  |  |  |  |  |  |  |  |  |
| UTS, MPa | 26.3 | 25.7 | 26.0 | 22.9 | 26.0 | 24.1 | 27.3 | 20.5 | 25.1 | 19.0 | 23.4 |
| M300, MPa | 8.1 | 8.2 | 8.4 | 8.0 | 8.8 | 8.3 | 8.9 | 8.0 | 7.5 | 6.8 | 6.7 |
| Elong., % | 620 | 620 | 620 | 600 | 620 | 590 | 620 | 550 | 620 | 630 | 550 |

TABLE 4

|  | 1 | 2 | 3 | 4 | 5 | 6 | 7 | 8 | 9 |
|---|---|---|---|---|---|---|---|---|---|
| Masterbatch B | 168 | 168 | 168 | 168 | 168 | 168 | 168 | 168 | 168 |
| Sulfur | 2 | 2 | 2 | 2 | 2 | 2 | 2 | 2 | 2 |
| Santoflex ® 13 Antidegradent | 2 | 2 | 2 | 2 | 2 | 2 | 2 | 2 | 2 |
| Santocure ® NS Accelerator | 1.2 | 1.2 | 1.2 | 0.8 | 0.8 | 0.8 | 0.8 | 0.8 | 0.8 |
| Thiurad ® Accelerator | — | — | — | 0.4 | 0.4 | 0.4 | — | — | — |
| Methasan ® Accelerator | — | — | — | — | — | — | 0.4 | 0.4 | 0.4 |
| Hexakis(cyclohexylthio)1,3,5-triazine-2,4,6-triamine | — | 0.5 | — | — | 0.5 | — | — | 0.5 | — |
| Hexakis(isopropylthio)1,3,5-triazine-2,4,6-triamine | — | — | 0.5 | — | — | 0.5 | — | — | 0.5 |
| Mooney Scorch @ 135° C. |  |  |  |  |  |  |  |  |  |
| t5, minutes | 23.0 | 50.5 | 57.0 | 12.0 | 27.0 | 32.5 | 12.5 | 30.0 | 35.0 |
| % increase in scorch safety | — | 120 | 148 | — | 125 | 171 | — | 140 | 176 |
| Stress-Strain @ 153° C. |  |  |  |  |  |  |  |  |  |
| UTS, MPa | 23.9 | 24.5 | 24.6 | 22.6 | 23.9 | 23.8 | 15.5 | 21.0 | 20.0 |
| M300, MPa | 14.2 | 13.6 | 13.1 | 13.8 | 13.5 | 12.2 | 14.9 | 13.8 | 13.7 |
| Elong., % | 450 | 480 | 500 | 450 | 480 | 520 | 310 | 420 | 400 |

The data show that all of the compounds are effective prevulcanization inhibitors and increase scorch safety of vulcanizable compositions containing them. The data show that they are especially effective with compositions containing a curative system comprising benzothiozyl disulfide and diphenyl guanidine. The data further show that the inhibitors containing six-SR groups attached to nitrogen (hexakis compounds) exhibit extraordinary potency.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

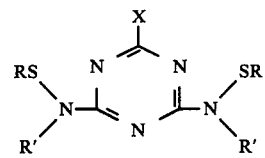

in which R' is hydrogen or —SR, X is hydrogen, chloro, alkoxy of 1-5 carbon atoms, alkylthio of 1-5 carbon atoms, NHR'', N(R'')2 where R'' is R or allyl, NHSR, N(SR)2 or R, and R is alkyl of 1-12 carbon atoms or alkyl substituted by cyano, acetoxy, or alkoxycarbonyl of 2-5 carbon atoms, cycloalkyl of 5-8 carbon atoms, aralkyl of 7-10 carbon atoms, phenyl, or phenyl substituted by chloro, alkyl of 1-5 carbon atoms, or alkoxy of 1-5 carbon atoms.

2. The compound of claim 1 in which R' is hydrogen.

3. The compound of claim 2 in which X is chloro.

4. The compound of claim 3 in which R is isopropyl.
5. The compound of claim 1 in which R' is —SR.
6. The compound of claim 5 in which X is chloro.
7. The compound of claim 6 in which R is isopropyl.
8. The compound of claim 5 in which X is $N(SR)_2$.
9. The compound of claim 8 in which R is phenyl, cyclohexyl or alkyl of 1-5 carbon atoms.
10. The compound of claim 9 in which R is secondary alkyl.
11. The compound of claim 10 in which R is isopropyl.
12. The compound of claim 9 in which R is phenyl.
13. The compound of claim 9 in which R is cyclohexyl.

* * * * *